US007627307B2

(12) United States Patent
Droste et al.

(10) Patent No.: US 7,627,307 B2
(45) Date of Patent: Dec. 1, 2009

(54) EMERGENCY CALL-BACK FOR A WIRELESS COMMUNICATION DEVICE EQUIPPED WITH A USER REMOVABLE MODULE

(75) Inventors: Scott T. Droste, Crystal Lake, IL (US); Naveen Aerrabotu, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 102 days.

(21) Appl. No.: 11/779,227

(22) Filed: Jul. 17, 2007

(65) Prior Publication Data
US 2007/0264990 A1 Nov. 15, 2007

Related U.S. Application Data

(63) Continuation of application No. 10/383,106, filed on Mar. 6, 2003, now Pat. No. 7,324,801.

(51) Int. Cl.
*H04M 11/04* (2006.01)
(52) U.S. Cl. ............... 455/404.1; 455/410; 455/411
(58) Field of Classification Search ............. 455/404.1, 455/433, 403, 405, 410, 411, 415, 432.3, 455/435.1, 412.1, 527, 528
See application file for complete search history.

(56) References Cited

U.S. PATENT DOCUMENTS

| 5,625,884 | A | * | 4/1997 | Gitlin et al. ............... 455/426.1 |
| 5,864,755 | A | * | 1/1999 | King et al. ............... 455/404.1 |
| 5,924,025 | A | * | 7/1999 | Kaplan et al. ............... 455/411 |
| 5,937,344 | A | | 8/1999 | Zicker |
| 5,956,634 | A | * | 9/1999 | Otterson et al. ............. 455/410 |
| 6,038,440 | A | * | 3/2000 | Wu ............................ 455/410 |
| 6,115,598 | A | * | 9/2000 | Yu ............................ 455/404.1 |
| 6,125,283 | A | * | 9/2000 | Kolev et al. ............... 455/552.1 |
| 6,226,510 | B1 | * | 5/2001 | Boling et al. ............. 455/404.2 |
| 6,311,055 | B1 | | 10/2001 | Boltz |
| 6,324,402 | B1 | | 11/2001 | Waugh et al. |
| 6,356,751 | B1 | | 3/2002 | Valentine et al. |
| 6,356,769 | B1 | | 3/2002 | Vehmas et al. |

(Continued)

FOREIGN PATENT DOCUMENTS

GB 2371946 A 8/2002

(Continued)

OTHER PUBLICATIONS

3GPP2, "Removable User Identity Module for Spread Spectrum Systems", 3rd Generation Partnership Project 2, Sep. 13, 2002, Version 1.0, 3Gpp2 C.S0023-A.

*Primary Examiner*—Jean A Gelin
(74) *Attorney, Agent, or Firm*—Hisashi D. Watanabe

(57) ABSTRACT

An apparatus (100) and method (200) for enabling a wireless communication device operating in a locked mode to receive an incoming call is provided. The wireless communication device is equipped with a user removable module (118) containing user information. As the wireless communication device (100) in the locked mode initially transmits a call to an emergency service center (212), the wireless communication device (100) receives an indication allowing it to access some of the user information contained in the user removable module (216). Using the accessed user information, the wireless communication device (100) is registered in a local network (402), enabling the wireless communication device to receive incoming call for a predefined period of time (220).

7 Claims, 4 Drawing Sheets

U.S. PATENT DOCUMENTS

| | | |
|---|---|---|
| 6,360,092 B1 | 3/2002 | Carrara |
| 6,373,817 B1 | 4/2002 | Kung et al. |
| 6,377,791 B1 | 4/2002 | Pirila |
| 6,397,054 B1 | 5/2002 | Hoirup et al. |
| 6,400,939 B1 | 6/2002 | Virtanen et al. |
| 6,408,063 B1 | 6/2002 | Slotte et al. |
| 6,411,807 B1 * | 6/2002 | Amin et al. ............. 455/432.3 |
| 6,434,377 B1 | 8/2002 | Penttinen |
| 6,463,286 B1 | 10/2002 | Salminen |
| 6,466,790 B2 | 10/2002 | Haumont et al. |
| 6,529,727 B1 * | 3/2003 | Findikli et al. ............. 455/411 |
| 6,571,092 B2 * | 5/2003 | Faccin et al. ............. 455/404.1 |
| 7,190,947 B2 * | 3/2007 | Binzel et al. ............. 455/404.1 |
| 7,267,735 B2 | 9/2007 | Chang |
| 7,268,052 B1 | 9/2007 | Xu et al. |
| 7,268,190 B2 | 9/2007 | Ohme et al. |
| 7,324,801 B2 * | 1/2008 | Droste et al. ............. 455/404.1 |
| 2002/0081179 A1 | 6/2002 | Vallstrom |
| 2002/0081992 A1 | 6/2002 | Keller et al. |
| 2002/0111159 A1 | 8/2002 | Faccin et al. |
| 2002/0142753 A1 | 10/2002 | Pecen et al. |
| 2002/0142805 A1 | 10/2002 | Pecen et al. |
| 2004/0176066 A1 * | 9/2004 | Binzel et al. ............. 455/404.1 |

FOREIGN PATENT DOCUMENTS

| | | |
|---|---|---|
| WO | 0021268 A2 | 4/2000 |
| WO | 0141458 A | 6/2001 |
| WO | 0265791 A1 | 8/2002 |

\* cited by examiner

EMERGENCY CALL-BACK FOR A WIRELESS COMMUNICATION DEVICE EQUIPPED WITH A USER REMOVABLE MODULE

CROSS-REFERENCE TO RELATED APPLICATIONS

The instant specification is a Continuation application and claims priority to U.S. patent application Ser. No. 10/383,106 (filed Mar. 6, 2003) now U.S. Pat. No. 7,324,801 by the same inventors.

FIELD OF THE INVENTION

The present invention generally relates to an apparatus and a method for receiving an emergency call, and more specifically to an apparatus and a method for a wireless communication device having a removable user information module configured to receive an emergency call in a locked mode.

BACKGROUND OF THE INVENTION

A wireless radiotelephone, such as a cellular telephone, typically operates in a wireless network by first registering its subscriber identity such as an international mobile subscriber identity ("IMSI") and a mobile identity number ("MIN"), to the wireless network. Once registered, the cellular telephone is allowed to initiate and to receive a call in the network. In a normal mode of operation, the cellular telephone receives an incoming call by monitoring a page for the IMSI address, and accepting the incoming call if the IMSI of the page matches the IMSI of the cellular telephone. If the cellular telephone is not registered, the network may refuse a call initiated by the cellular telephone, and the cellular telephone will not be allowed to receive a call targeted to the cellular telephone. The cellular telephone may become unregistered in several ways. For example, the cellular telephone may no longer have a valid subscription with any wireless network; the cellular telephone may be in a locked mode where a user has failed to properly enter a passcode such as a personal identification number ("PIN"); the current visited network may not have roaming agreement with the subscriber's home network; or the cellular telephone may be missing a required user module such as a subscriber identification module ("SIM") card for a Global System for Mobile Communications ("GSM") type cellular telephone or a removable user identity module ("R-UIM") for a code division multiple access ("CDMA") type cellular telephone. For a SIM or R-UIM equipped cellular telephone, once the cellular telephone becomes unregistered and enters a locked mode, information contained in the SIM or R-UIM becomes inaccessible. However, an unregistered cellular telephone, or a cellular telephone in the locked mode, may still be operated in limited capability to initiate an emergency call to an emergency service center. The emergency call to the emergency service center may be identified by a prestored telephone number dedicated for emergency use, for example, 911 in the United States and 112 in Europe. However, the cellular telephone in the locked mode of operation is disallowed to receive any incoming call including a call back from the emergency service center.

DETAILED DESCRIPTION OF THE PREFERRED EMBODIMENTS

The present invention provides an apparatus and method for a wireless communication device having a user removable module, which contains user information, for receiving an incoming call in response to initiating an emergency call to an emergency service center such as police and fire station while the wireless communication device is operating in a locked mode.

The wireless communication device such as a cellular telephone may enter the locked mode by simply not having a valid service subscription with a wireless network in which the wireless communication device is currently located. The wireless communication device may also enter the locked mode by failing to receive a proper password from a user to unlock the wireless communication device to access information contained in a required user module. A subscriber identification module ("SIM") card for a Global System for Mobile Communications ("GSM") type cellular telephone and a removable user identity module ("R-UIM") for a code division multiple access ("CDMA") type cellular telephone are examples of such required user modules. When the wireless communication device is operating in the locked mode, the wireless communication device is prevented from making or receiving a normal call but is allowed to initiate an emergency call to an emergency service center. The present invention enables the wireless communication device to receive an incoming call for a predefined period of time after initiating an emergency call to an emergency center.

Figure 1:
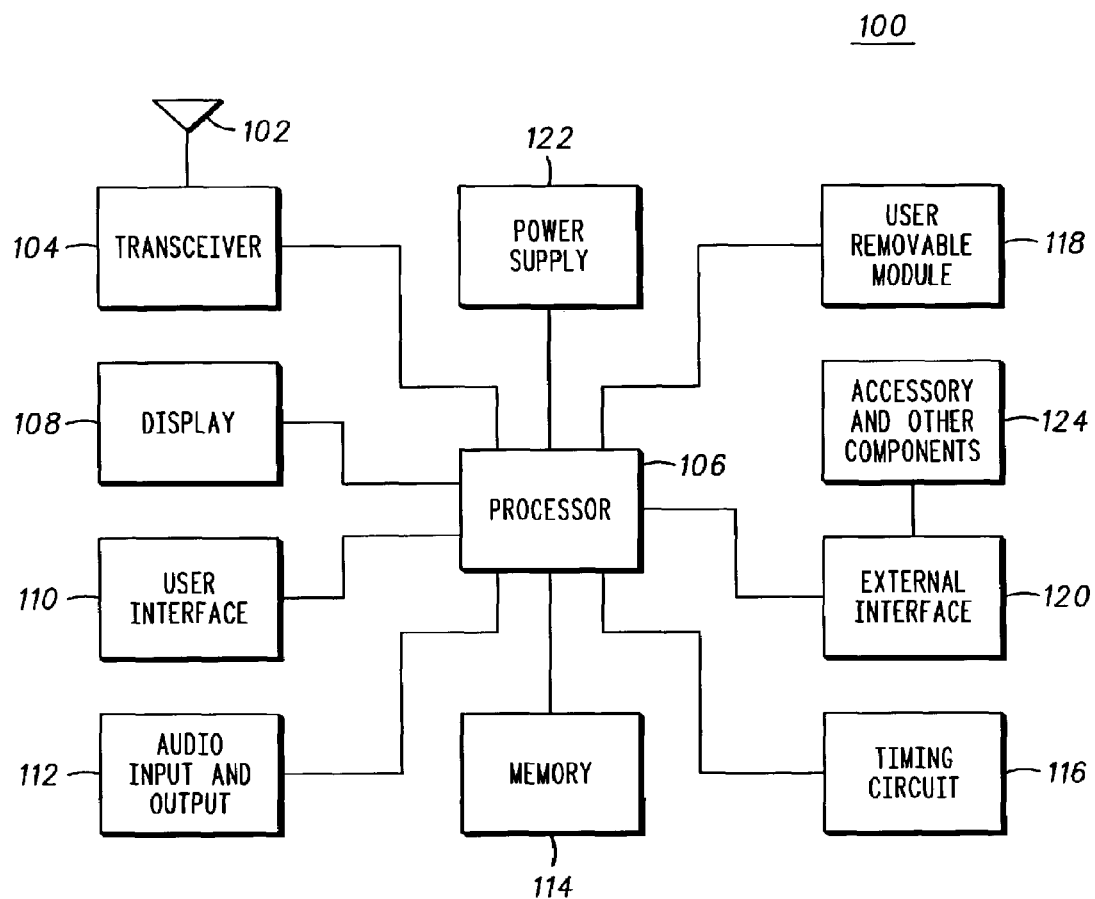
FIG. 1 is an exemplary block diagram of the present invention.

FIG. 1 is an exemplary block diagram of a wireless communication device 100 having emergency call back reception functionality in accordance with a preferred embodiment of the present invention. The wireless communication device 100 may be, but is not limited to, a radiotelephone such as a cellular phone or two-way radio, a paging device, a personal digital assistant ("PDA"), a handheld computer, an audio/video device such as a television or an MP3 player, a network browsing device, a tablet for a pen, a touchpad for a finger or a pen, a touch keypad for a finger, a virtual pen, or any type of computing and communicating device having a user removable module containing user information required to operate the device. The wireless communication device 100 includes an antenna 102, a transceiver 104, a processor 106, a display 108, a user interface 110, an audio input and output 112, a memory circuit 114, a timing circuit 116, and a user removable module 118. The internal components of the wireless communication device 100 may further include a external interface 120 and a power supply 122. Accessories and additional components 124 such as a speaker phone module and hands-free kit may be coupled to the external interface 120 to provide additional functionality and capabilities to the device 100. The power supply 122, such as a battery, is controlled by the processor 106, and provides power to the internal components so that they may function correctly.

Generally, the wireless communication device 100 functions as described below. Upon reception of wireless signals, the wireless communication device 100 detects the signals through the antenna 102 to produce detected voice and/or data signals. A receiver in the transceiver 104, coupled to the antenna 102, converts the detected signals into electrical baseband signals and demodulates the electrical baseband signals to recover incoming information, such as voice and/or data, transmitted by the wireless signals. After receiving the incoming information from the receiver in the transceiver 104, the processor 106 formats the incoming information for output to the display 108 and/or audio input and output 112. Likewise, for transmission of wireless signals, the processor 106 formats outgoing information, which may be entered through the input part of the audio input and output 112 or through the user interface 110, and conveys it to a transmitter in the transceiver 104 for modulation of a carrier and conversion into modulated signals. The transmitter in the transceiver 104 conveys the modulated signals to the antenna 102 for transmission to a remote transceiver (not shown).

Input and output devices of the wireless communication device 100 may include a variety of visual, audio and/or motion devices. The output devices may include, but are not limited to, the display 108 and the audio outputs such as speakers, alarms and buzzers of the audio input and output 112. The display 108 may include liquid crystal displays, light emitting diode indicators, or any other displays. The input devices may include, but are not limited to, the user interface 110 and audio inputs of the audio input and output 112. The user input 110 may include keyboards, key pads, selection buttons, touch pads, touch screens, capacitive sensors, motion sensors, switches, or any other user inputs. The audio input of the audio input and output 112 may include a microphone or any other audio input.

The internal components of the wireless communication device 100 further include the memory circuit 114 for storing and retrieving data and the timing circuit 116. The processor 106 may perform various operations to store, manipulate and retrieve information in the memory circuit 114.

Upon powering on, the processor 106 determines whether the wireless communication device 100 is operating in the locked mode. If the processor 106 determines that the wireless communication device 100 is operating in the locked mode, the access to the information contained in the user removable module 118 is denied, and the processor 106 prevents any call from being initiated except for an emergency call. To determine whether a call is an emergency call, the processor 106 compares a telephone number entered through a user interface 110 and a telephone number prestored in its memory 114 such as "911" in the United States and "112" in Europe. If the telephone number and the prestored telephone number match, then the processor 106 initiates the emergency call, and causes the transmitter in the transceiver 104 to transmit the emergency call. After the transmission of the emergency call, the processor 106 is enabled to process incoming calls upon reception by the receiver of the transceiver 104 for a predefined period of time.

The processor 106 monitors whether the emergency call has received a channel assignment after the transmission of the emergency call. Upon the emergency call receiving a channel assignment, the processor 106 accesses at least a part of the information contained in the user removable module 118, and uses the information accessed to complete the call. After the emergency call is completed, the processor 106 uses the information accessed in the user removable module 118 to register the wireless communication device 100 in a local wireless communication network.

Figure 2:
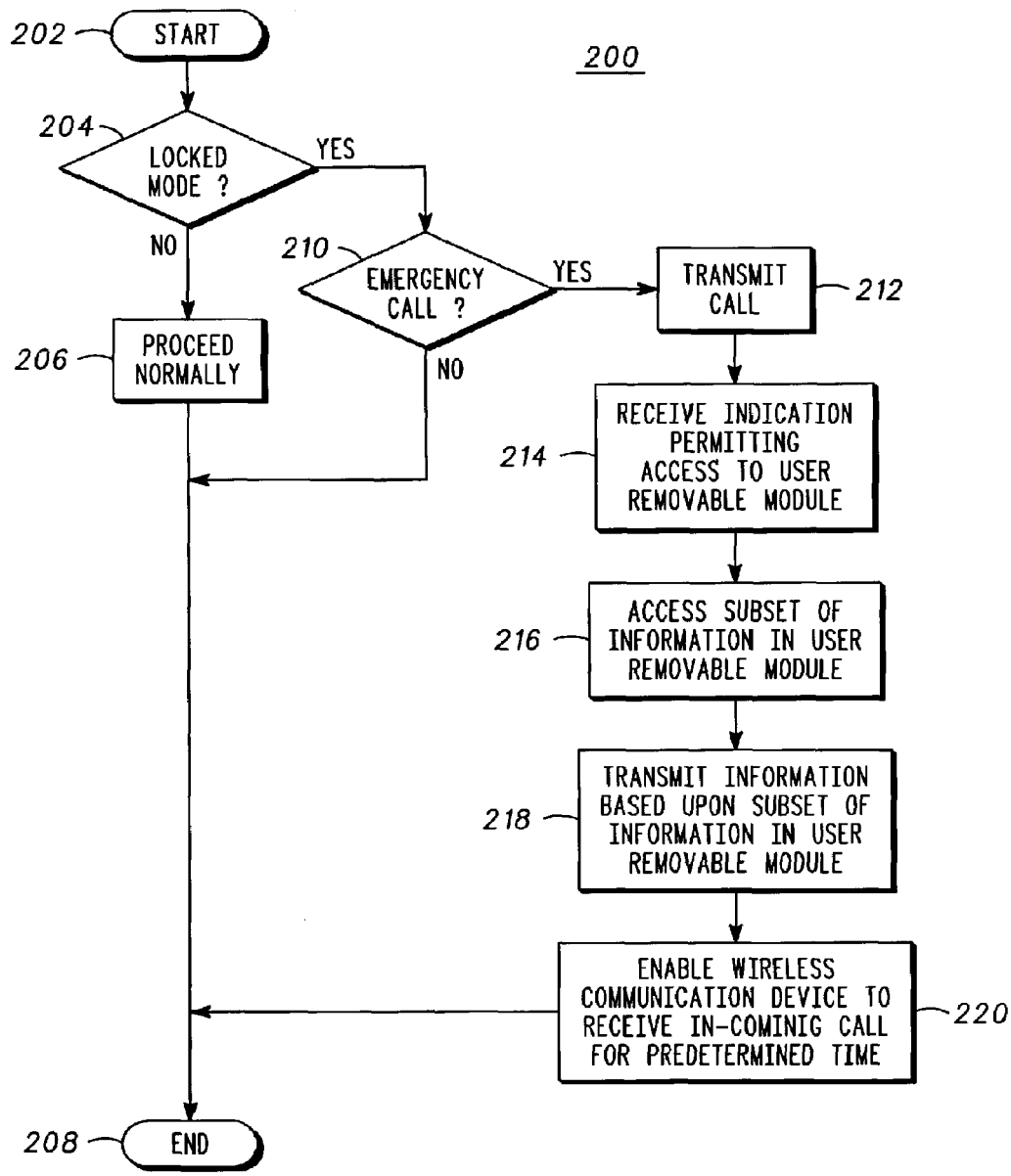
FIG. 2 is an exemplary flow chart of a preferred embodiment of the present invention in a wireless communication device.

Timing information regarding the predefined period of time for which the wireless communication device 100 is enabled to receive the incoming call is stored in the memory circuit 114 along with duration information specifying how long the predefined period of time has been in effect. The timing circuit 116 may include clock circuitry that provides the current time and/or a timer that provides elapsed time from a particular starting time such as a beginning of the duration of the predefined period of time. Different starting times, such as the initiation of the emergency call, the channel assignment, and the termination of the initial emergency call, may be defined as the beginning of the duration of the predefined period of time FIG. 2 is an exemplary flow chart 200 outlining the operation of the wireless communication device 100 according to a first embodiment. The process begins in block 202, and the wireless communication device 100 determines whether the wireless communication device 100 is operating in a locked mode in block 204. In the locked mode of operation, the wireless communication device is prevented from accessing user information contained in the user removable module 118, and has a limited functionality. If the wireless communication device 100 is determined not to be operating in the locked mode, then all call related processes are performed normally in block 206, and the process terminates in block 208. If the wireless communication device 100 is determined to be operating in the locked mode in block 204, then upon initiating a call, which may be indicated by receiving a telephone number for the call to be made, the wireless communication device 100 determines whether the call is an emergency call in block 210. Whether the call is an emergency call may be determined by comparing the telephone number entered with a predefined telephone number for an emergency service center stored in the memory circuit 114 of the wireless communication device 100. If the call is determined not to be an emergency call in block 210, then the process terminates in block 208. If the call is determined to be an emergency call in block 210, then the wireless communication device 100 transmits the call in block 212, and receives an indication permitting the wireless communication device 100 to access a certain subset of the user information contained in the user removable module 118 in block 214.

Upon receiving the indication permitting to access the subset of the user information contained in the user removable module 118, the wireless communication device 100 accesses the subset of the user information in block 216, and transmits relevant information based upon the subset of the user information accessed in block 218. By transmitting the relevant information and having access to certain user information contained in the user removable module 118, the wireless communication device 100 begins to operate in a mode similar to the normal operation mode, and becomes able to receive incoming calls in block 220 for a predefined period of time. The process then terminates in block 208.

Figure 3:
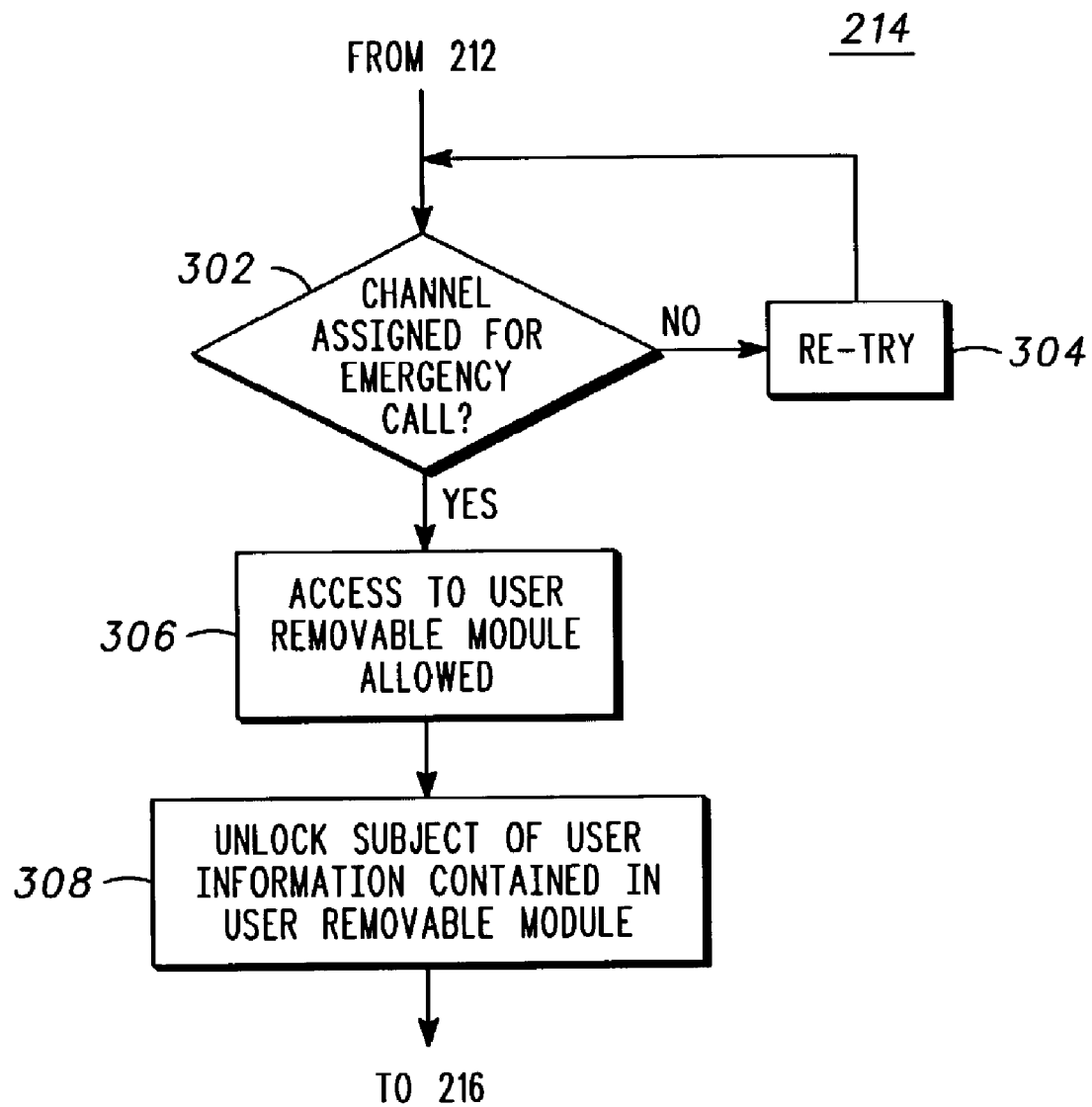
FIG. 3 is an exemplary flow chart describing one of the blocks of FIG. 2 according to the preferred embodiment.

FIG. 3 is an exemplary flow chart further describing block 214 of FIG. 2 according to the preferred embodiment. After the emergency call has been transmitted in block 212, the wireless communication device 100 monitors a channel assignment for the call in block 302, and may re-try the emergency call for a predetermined number of times in block 304 if no channel is assigned to the emergency call, i.e. if the call is unsuccessful. If the call is assigned a channel in block 302 in response to transmitting the emergency call, then in block 306, the wireless communication device 100 interprets the channel assignment for the emergency call as an indication permitting the wireless communication device 100 to access the user information contained in the user removable module 118. The wireless communication device 100 then executes a command unlocking at least a subset of the user information in block 308. The process then continues to block 216. Alternatively, the wireless communication device 100 may monitor a service connect message and/or a call acknowledgement order for the call to determine whether the call has been established instead of, or in addition to, monitoring the channel assignment for the call in block 302.

Figure 4:
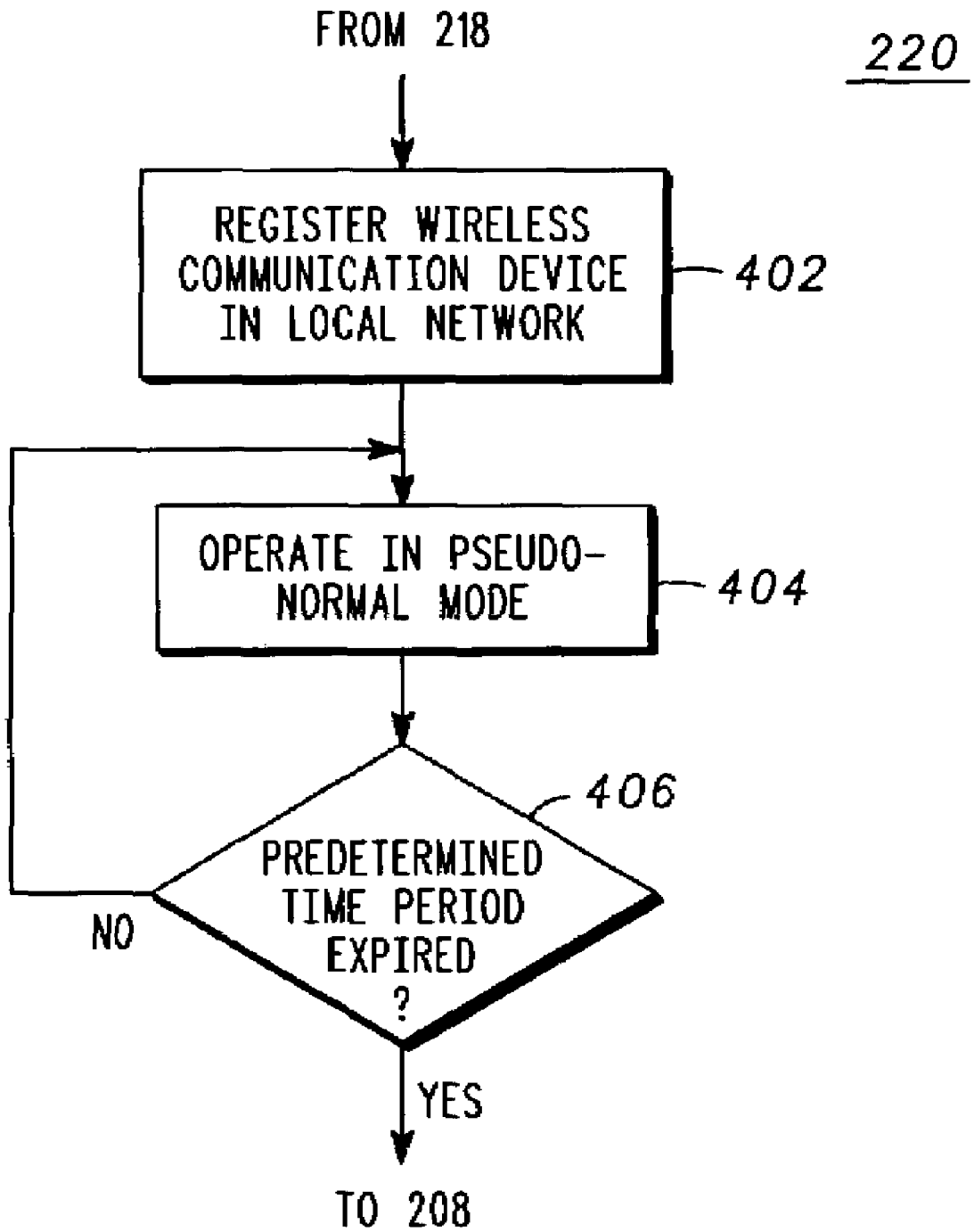
FIG. 4 is an exemplary flow chart describing one of the blocks of FIG. 2 according to the preferred embodiment.

FIG. 4 is an exemplary flow chart further describing block 220 of FIG. 2 according to the preferred embodiment. By transmitting the relevant information based upon the subset of the user information accessed in block 218, the wireless communication device 100 is able to register in a local wireless communication network where the wireless communication device 100 is currently located in block 402. By registering in the local network, the wireless communication device 100 is able begin operating in a pseudo-normal mode similar to the normal operation mode in block 404, and is able to receive incoming calls for a predefined period of time. Whether the elapsed time has exceeded the predefined period of time such as 45 minutes or a certain length in time otherwise provided is checked in block 406. If the elapsed time is within the predefined period of time, the wireless communication device 100 continues to respond to incoming calls and operate in the pseudo-normal mode in block 404, and continues to monitor the elapsed time in block 406. Upon expiration of the predefined period of time, the wireless communication device 100 terminates the process in block 208.

Monitoring of the elapsed time may be accomplished by using an internal clock in the timing circuit 116 of the wireless communication device 100 or by receiving time information from an external time source such as a network time source. The predefined time period may be defined to run from the time the successful channel assignment is made in block 302, from the time the wireless communication device 100 is registered in the local network in block 402, or from the time the emergency call has terminated. The predefined period of time may be renewed upon initiating a new emergency call to the emergency service provider, or upon receiving a call back from the emergency service provider. The start time of the predefined time period may be stored in the internal memory 114 or in the user removable module 118. Storing the start time in the user removable module 118 enables the user within the predefined time period to use a different user-removable-module-equipped communication device by placing the user removable module 118 into the different user-removable-module-equipped communication.

By registering to the local network, if the wireless communication device 100 changes its location, it can be handed off from one cell to another without losing a communication link. It also enables the wireless communication device 100 to receive an incoming call from a source other than the called emergency service center. For example, a caller using the wireless communication device 100 makes an emergency call to a local police department, and the police department dispatches a police car. Then, a police officer in the police car will able to call back the caller the same way as a normal call without having to route the call-back through the police department to affix the call-back origin.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device configured to operate in a locked mode and configured to use a user removable module which contains user information, the wireless communication device comprising:
   a user interface configured to receive a telephone number;
   a memory circuit configured to store a predefined telephone number therein;
   a processor coupled to the user interface and the memory, the processor configured to initiate a call while the wireless communication device is operating in the locked mode if the telephone number received by the user interface matches the predefined telephone number stored in the memory;
   a transmitter coupled to the processor, the transmitter configured to transmit the call upon initiation of the call by the processor;
   a receiver coupled to the processor, the receiver configured to receive incoming calls after the transmission of the call, wherein the processor is configured to access at least a subset of the user information contained in the user removable module for a predefined period of time after the transmission of the call; and
   a timing circuit coupled to the processor configured to generate a start time of the predefined period of time and to provide timing information to the processor,
   wherein the memory circuit is configured to store the start time, and the processor is configured to determine whether the predefined period of time has expired based upon comparison between the start time in the memory circuit and the timing information received from the timing circuit.

2. The wireless communication device of claim 1, wherein the processor is configured to process the incoming calls for the predefined period of time after the transmission of the call.

3. The wireless communication device of claim 1, wherein the processor is configured to monitor a channel assignment for the call after the transmission of the call.

4. The wireless communication device of claim 3, wherein the processor accesses the at least a subset of the user information contained in the user removable module after the channel assignment for the call is made.

5. The wireless communication device of claim 1, wherein the processor is configured to register the wireless communication device to a local network after the processor accesses the at least a subset of the user information contained in the user removable module.

6. The wireless communication device of claim 1, wherein the processor is configured to place the wireless communication device in the locked mode upon determining the predefined period of time has expired.

7. The wireless communication device of claim 6, wherein the timing circuit is configured to provide timing information based upon an external time reference.

* * * * *